United States Patent
Karimli et al.

(10) Patent No.: US 10,897,690 B2
(45) Date of Patent: Jan. 19, 2021

(54) DEVICE-ENABLED ESIM PROFILE ACQUISITION

(71) Applicant: T-Mobile USA, Inc., Bellevue, WA (US)

(72) Inventors: Yasmin Karimli, Kirkland, WA (US); Ming Shan Kwok, Seattle, WA (US)

(73) Assignee: T-Mobile USA, Inc., Bellevue, WA (US)

( * ) Notice: Subject to any disclaimer, the term of this patent is extended or adjusted under 35 U.S.C. 154(b) by 132 days.

(21) Appl. No.: 15/693,335

(22) Filed: Aug. 31, 2017

(65) Prior Publication Data

US 2019/0069122 A1 Feb. 28, 2019

(51) Int. Cl.
| | |
|---|---|
| *H04W 4/50* | (2018.01) |
| *H04W 8/20* | (2009.01) |
| *H04M 15/00* | (2006.01) |
| *H04M 17/02* | (2006.01) |
| *H04W 4/24* | (2018.01) |
| *H04M 17/00* | (2006.01) |
| *H04M 1/725* | (2006.01) |
| *H04W 8/26* | (2009.01) |
| *H04W 8/18* | (2009.01) |

(52) U.S. Cl.
CPC ............ *H04W 4/50* (2018.02); *H04M 15/48* (2013.01); *H04M 15/705* (2013.01); *H04M 15/715* (2013.01); *H04M 15/723* (2013.01); *H04M 17/02* (2013.01); *H04M 17/103* (2013.01); *H04W 4/24* (2013.01); *H04W 8/205* (2013.01); *H04M 1/72525* (2013.01); *H04W 8/183* (2013.01); *H04W 8/26* (2013.01)

(58) Field of Classification Search
CPC ...... H04W 4/50; H04W 8/205; H04M 15/715
See application file for complete search history.

(56) References Cited

U.S. PATENT DOCUMENTS

| | | | |
|---|---|---|---|
| 2009/0061934 A1* | 3/2009 | Hauck | H04W 8/265 455/558 |
| 2013/0260734 A1* | 10/2013 | Jain | G06Q 30/0601 455/418 |
| 2015/0350877 A1 | 12/2015 | Li et al. | |

(Continued)

FOREIGN PATENT DOCUMENTS

WO    WO2017061800 A1    4/2017

OTHER PUBLICATIONS

The PCT Search Report and Written Opinion dated Nov. 23, 2018, for PCT Application No. PCT/US2018/045620, 9 pages.

*Primary Examiner* — Ernest G Tacsik
(74) *Attorney, Agent, or Firm* — Lee & Hayes, P.C.

(57) ABSTRACT

Device-enabled embedded subscriber identity module (eSIM) profile acquisition is described. Server(s) associated with a service provider can receive, from an application of a device operated by a user, identification data including at least an identifier corresponding to an eSIM associated with the device. The server(s) can store an association between a profile and the identifier in a database. The server(s) can receive, from the device, a request for the profile, which can include the identifier. The server(s) can access the database to identify, based at least in part on the identifier, the association between the profile and the identifier and provision, to the device, the profile to cause the profile to be associated with the eSIM associated with the device.

20 Claims, 11 Drawing Sheets

(56) References Cited

U.S. PATENT DOCUMENTS

| | | | |
|---|---|---|---|
| 2016/0014280 A1* | 1/2016 | Brunsman | H04M 15/774 455/407 |
| 2016/0020802 A1 | 1/2016 | Lee et al. | |
| 2016/0021484 A1* | 1/2016 | Park | H04W 4/70 455/418 |
| 2016/0218874 A1 | 7/2016 | Hauck et al. | |
| 2017/0048645 A1* | 2/2017 | Yerrabommanahalli | H04W 8/205 |
| 2017/0149827 A1* | 5/2017 | Sims | H04L 63/102 |
| 2017/0156051 A1* | 6/2017 | Park | H04L 67/22 |
| 2017/0347259 A1* | 11/2017 | Kwak | H04W 8/205 |
| 2018/0063668 A1* | 3/2018 | Li | H04W 12/06 |
| 2018/0103335 A1* | 4/2018 | Bruner | H04W 4/50 |
| 2018/0146364 A1* | 5/2018 | Coureau | H04L 61/1511 |
| 2019/0174299 A1* | 6/2019 | Ullah | H04W 8/24 |

* cited by examiner

DEVICE-ENABLED ESIM PROFILE ACQUISITION

BACKGROUND

Mobile devices can be associated with subscriber identity module (SIM) cards which store personal information of respective account holders. A SIM card can be a portable memory chip or an integrated memory chip. A SIM card associated with a mobile device can store data associated with a subscriber identity corresponding to an account holder associated with the mobile device, a phone number of the account holder, an address book of the account holder, text messages sent and received via the mobile device, and other data. Generally, when a consumer opens an account associated with a service provider, such as a telecommunication service provider, the service provider can activate a SIM card of a mobile device associated with the account. That is, each SIM card includes a unique number printed on the memory chip which requires activation by the service provider (e.g., via a website associated with the service provider, via a call to the service provider, via provisioning by the service provider, etc.). Following activation of an account by the service provider, the consumer, via the mobile device, can utilize various services offered by the service provider.

In some examples, for instance with an embedded (also called electronic or enhanced) subscriber identity module (eSIM), a profile (e.g., an eSIM profile) including a unique number (i.e., associated with a service provider) and other data (e.g., account information (e.g., subscription key, identity and/or service plan profiles, etc.), restrictions, etc.) can be downloaded by a mobile device, and no further activation is required to activate an account associated with the service provider and/or otherwise use services available from the service provider. For instance, a local profile assistant (e.g., computer-readable instructions) associated with a mobile device can download a profile from a service provider and install the profile on the mobile device. As a result, the eSIM of the mobile device can be associated with the downloaded profile provided by the service provider. General profile provisioning is defined in GSMA RSP (Remote SIM Provisioning) for consumer devices technical specification standard SGP.22, for example.

BRIEF DESCRIPTION OF THE DRAWINGS

The detailed description is set forth with reference to the accompanying figures. In the figures, the left-most digit(s) of a reference number identifies the figure in which the reference number first appears. The use of the same reference numbers in different figures indicates similar or identical items or features.

DETAILED DESCRIPTION

Figure 1:
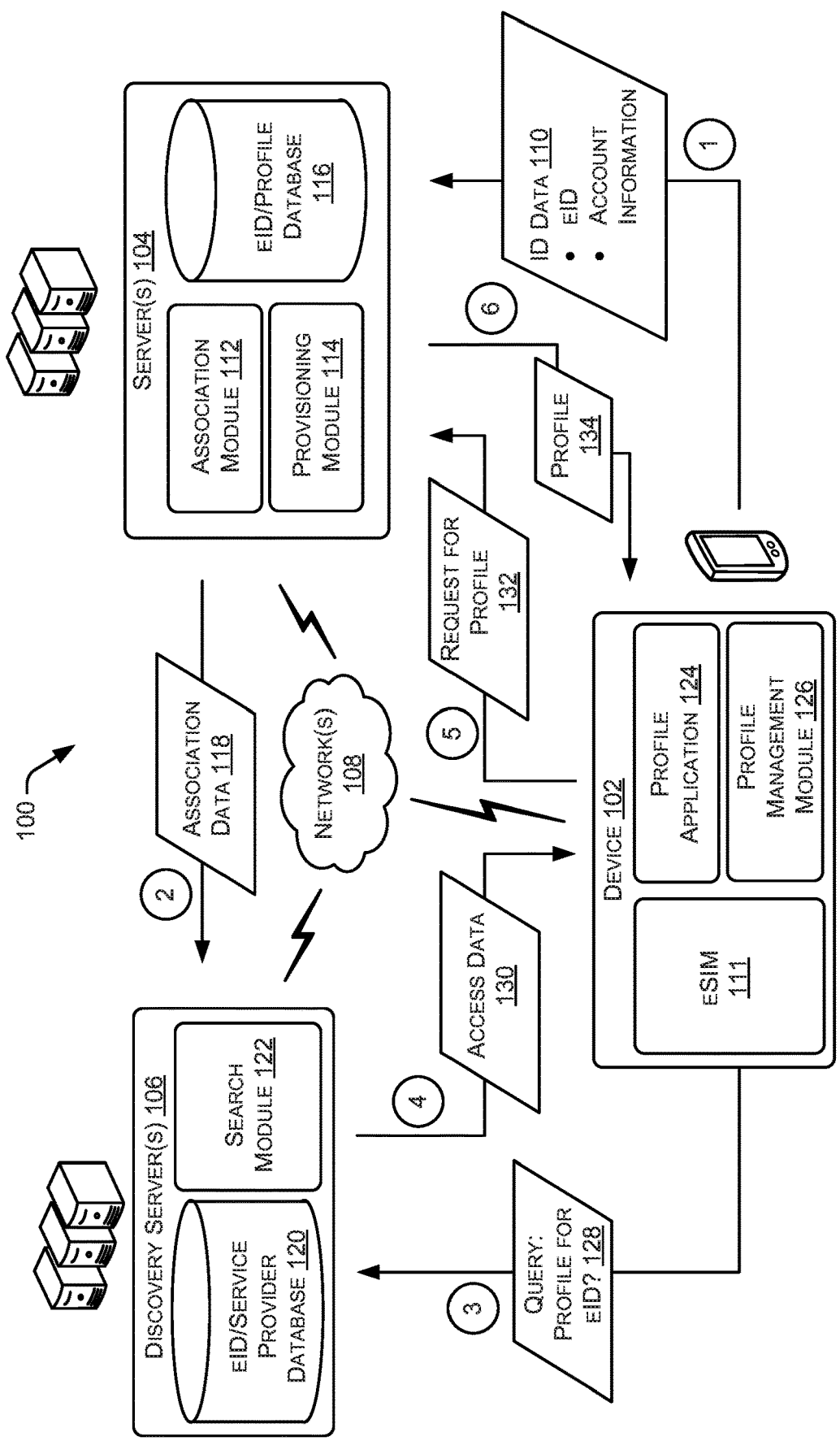
FIG. 1 illustrates an environment for provisioning access to a service provider via profile management.

In examples of the present disclosure, device-enabled profile acquisition is described. As described above, devices can be associated with subscriber identity modules (SIMs). For the purpose of this discussion, a SIM can be associated with a card (portable memory chip or an integrated memory chip), but is referred to as a SIM throughout. SIMs store personal information of respective account holders. eSIMs are integrated into a device and can be associated with profiles that correspond to particular service providers. For the purpose of this discussion, an eSIM can refer to an embedded subscriber identity module, which can also be called an electronic subscriber identity module or an enhanced subscriber identity module. That is, an eSIM can refer to a SIM that is integrated into a device and can be provisioned with profile(s) by remotely located service provider(s). General profile provisioning is defined in GSMA RSP standard SGP.22, as described above.

As described above, with eSIMs, a profile (e.g., an eSIM profile) can be downloaded by a device. For the purpose of this discussion, one or more data items can collectively represent a profile. A profile can include data such as account information (e.g., a subscription key, identity and/or service plan profile, etc.), restrictions, etc. In at least one example, a local profile assistant (e.g., computer-readable instructions) associated with a device can download a profile from a service provider, such as a telecommunication service provider, and install the profile on the device. As a result, the eSIM of the device can be associated with the downloaded profile, which is associated with the service provider, and the device can access services provided by the service provider.

Techniques described herein are directed to an application that enables users to effectuate profile acquisition via their respective devices. That is, techniques described herein are directed to enabling users to provision identification data to service provider(s) and to access profile(s) from remotely located service provider(s). The service provider(s) can leverage the identification data to set up associations between identifiers of particular eSIMs and profiles. Such associations can be utilized for remotely provisioning profile(s) to the respective devices. Additional details are provided below with reference to FIGS. 1-13.

Techniques described herein are directed to various improvements over conventional computer-related technologies. For instance, techniques described herein are directed to customizing and/or configuring profile(s) that are remotely provisioned from service provider(s) and stored in association with eSIMs on devices. That is, the techniques described herein are directed to enabling server(s) associated with a service provider to determine a profile that can be remotely provisioned to an end user (e.g., a device) to activate services that are available from the service provider.

In addition to reducing the friction traditionally present in activating services for a device, techniques described herein are directed to enhancing the device and/or network security. For instance, by associating profiles and identifiers at one or more first servers and providing an indication of such an association to one or more second servers, which ultimately provide a device access to a profile that is stored on the one or more first servers, techniques described herein can help limit network access to authorized devices and assist in ensuring that profiles are provisioned to appropriate devices.

FIG. 1 illustrates an environment 100 for provisioning access to a service provider via profile management. Environment 100 includes a device 102, one or more server(s) 104, and one or more discovery server(s) 106. The device 102, the server(s) 104, and/or the discovery server(s) 106 can communicate with one another via network(s) 108. The network(s) 108 can include a cellular network, the Internet, and/or other networks.

In at least one example, the device 102 can provision identification data 110 (ID data 110) to the server(s) 104. The identification data 110 can include an identifier (e.g., eID) of an eSIM 111 associated with the device 102 and account information associated with an existing account (or to-be-established account) with a service provider. Additional details associated with the identification data 110 are described below.

In some examples, the server(s) 104 can be associated with the service provider, which can be a telecommunication service provider provisioning telecommunication services, for example. The server(s) 104 can be associated with an association module 112, a provisioning module 114, and/or an eID/profile database 116. The association module 112 can map, or otherwise associate, the identification data with a profile, as described with additional detail below. In at least one example, the association module 112 can map, or otherwise associate, an identifier (e.g., eID) that is particular to the eSIM 111 of the device 102 with the profile in the eID/profile database 116. Additionally, in at least one example, the association module 112 can provide an indication of the association between the identifier and the profile to the discovery server(s) 106 via association data 118. In some examples, the association module 112 can provide the indication responsive to a request for information about associations(s) established via the server(s) 104. That is, in some examples, the association module 112 can push indication(s) of association(s) to the discovery server(s) 106 and in other examples, the association module 112 can send indication(s) of association(s) responsive to a request for such information.

The discovery server(s) 106 can be associated with an eID/service provider database 120 that stores previously provided associations between identifiers and service providers. The discovery server(s) 106 can analyze an indication of an association between an identifier and a profile to determine a service provider that sent the indication. Based on identifying the service provider that sent the indication, the discovery server(s) 106 can map, or otherwise associate, the identifier and the service provider, and store such an association in the eID/service provider database 120. For instance, the identifier of the eSIM of the device 102 may be mapped to, or otherwise associated with, an indication of the service provider in the eID/service provider database 120. The discovery server(s) 106 may also include a search module 122 to facilitate determining whether an identifier is associated with a service provider in the eID/service provider database 120. Additional details are provided below.

The device 102 can be associated with an eSIM 111, as described above. The eSIM 111 can be associated with one or more profiles, which can enable the device 102 to utilize service(s) associated with each of the one or more profiles (depending on which of the profile(s) are active). The device 102 can additionally be associated with a profile application 124 and a profile management module 126. The profile application 124 can enable a user to initiate profile acquisition via the device 102. The profile management module 126 can facilitate the acquisition of a profile and the association of the profile with the eSIM 111.

In at least one example, the profile application 124 can send a query 128 to the discovery server(s) 106 to determine whether the discovery server(s) 106 are aware of a profile that is available for an identifier associated with the eSIM 111. That is, the device 102 can query the discovery server(s) 106 to determine whether the eID/service provider database 120 is storing an association between the identifier and a service provider. The query can include the identifier. In at least one example, the search module 122 can perform a look-up, or otherwise analyze associations in the eID/service provider database 120, to determine whether the identifier is mapped to, or otherwise associated with, one or more indications of one or more service providers. In at least one example, if the search module 122 does not identify an association between the identifier and a service provider initially, the search module 122 can send a request to one or more service providers to provide an indication whether the identifier is associated with a profile of any of the one or more service providers. Based on determining that the eID/service provider database 120 is storing an association between the identifier and the service provider (or, based on receiving an indication of an association responsive to a request for such information), the search module 122 can send access data 130 to the device 102. That is, the search module 122 can return a result as the access data 130. In at least one example, the access data 130 can include an address for communicating with the service provider associated with the profile that is available for the identifier.

The profile management module 126 can leverage the access data 130 and can send a request 132 for a profile to the server(s) 104. In at least one example, the request 132 can include the identifier. The provisioning module 114 can receive the request 132 and can access the eID/profile database 116 to determine which profile is mapped to, or otherwise associated with, the identifier. The provisioning module 114 can retrieve the profile 134 and send the profile 134 (or means to accessing the profile 134) to the device 102. The profile management module 126 can access the profile 134 and associate the profile 134 with the eSIM 111. In some examples, the profile management module 126 can receive the profile 134 from the server(s) 104 (e.g., the provisioning module 114 can push the profile 134 to the device 102). In other examples, the profile management module 126 can download the profile 134 from the server(s) 104 responsive to providing an access code to enable secure transmission of the profile 134. Responsive to accessing the profile 134, the profile management module 126 can associate the profile 134 with the eSIM 111. Based on the profile 134 being associated with the eSIM 111, the device 102 can access telecommunication services from the service provider.

FIG. 1 includes indicators associated with each communication enumerating an example order in which the communications are exchanged. For instance, in at least one example, the device 102 can send the identification data 110 to the server(s) 104 (1), which can then send the association data 118 to the discovery server(s) 106 (2), and so on. It should be noted however, that in at least one example, one or more of the communications can be sent at substantially the same time.

Figure 2:
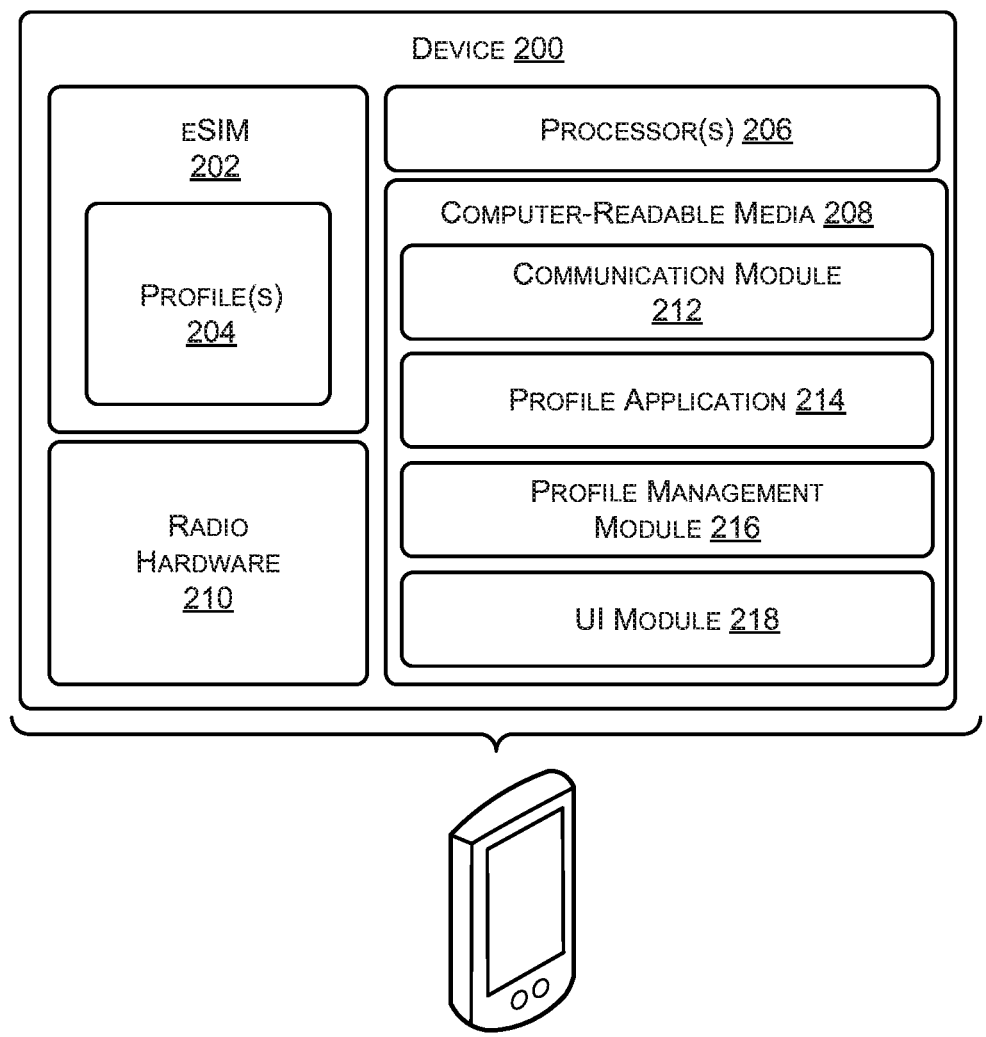
FIG. 2 illustrates an example device for acquiring access to a service provider via profile management.

FIG. 2 illustrates an example device 200 for acquiring access to a service provider via profile management. Device 200 may correspond to device 102 described above with reference to FIG. 1.

Device 200 can correspond to user equipment (UE), which can be operated by a user (e.g., an account holder). The user can be an entity (e.g., person, company, etc.) that subscribes (or desires to subscribe) to services, such as telecommunication services, via a service plan. The service plan can indicate an amount of data, voice calling, and/or text messaging available to the device 200, whether data, voice calling, and/or text messaging is available internationally, data transmission speeds accessible to the device 200, etc. The service plan can be available to the user for a particular rate. In some examples, the service plan is active for a particular period of time (e.g., a two-year plan, a five-year plan, etc.). In at least one example, a service plan can be associated with a particular profile, as described herein. The profile can be associated with data that indicates account information (subscription key, identity and/or service plan profiles, etc.), restrictions, etc.

Device 200 can correspond to UE including, but not limited to, a smart phone, a personal digital assistant, a netbook, a laptop computer, a smart appliance, and/or another electronic device that is capable of sending or receiving voice, video, and/or data via network(s) (e.g., network(s) 108). In at least one example, the device 200 can include an eSIM 202, which can be an integrated memory chip, as described above. The eSIM 202 can correspond to eSIM 111 described above with reference to FIG. 1. The eSIM 202 can store personal information of a user, such as, but not limited to, data associated with a phone number of a user associated with the device 200, an address book of the user, text messages sent and received via the device 200, and other data.

In at least one example, the eSIM 202 can be associated with an identifier. The identifier can be a unique code that is particular to the eSIM 202. That is, the identifier can uniquely identify the eSIM 202 that is associated with the device 200. In at least one example, the identifier can be an eUICC-ID (e.g., eID).

In at least one example, the eSIM 202 can be associated with profile(s) 204. As described above, the profile(s) 204 can indicate which service plans, services, functionalities, etc. are available for the device 200 from a particular service provider. As described above, a profile of the profile(s) 204 can be associated with data including account information (e.g., a subscription key, identity and/or service provider profiles, etc.), restrictions, etc. In at least one example, the one or more restrictions can indicate that a profile cannot be removed from the device 200, the profile cannot be deactivated, etc.

The device 200 can include processor(s) 206, computer-readable media 208, and radio hardware 210. The processor(s) 206 can represent, for example, a central processing unit (CPU)-type processing unit, a graphics processing unit (GPU)-type processing unit, a Field-Programmable Gate Array (FPGA), another class of Digital Signal Processor (DSP), or other hardware logic components that can, in some instances, be driven by a CPU. For example, and without limitation, illustrative types of hardware logic components that can be used include Application-Specific Integrated Circuits (ASICs), Application-Specific Standard Products (ASSPs), System-on-a-Chip Systems (SOCs), Complex Programmable Logic Devices (CPLDs), etc. In at least one example, an accelerator can represent a hybrid device, such as one from ZYLEX or ALTERA that includes a CPU course embedded in an FPGA fabric. In various embodiments, the processor(s) 206 can execute one or more modules and/or processes to cause the device 200 to perform a variety of functionalities, as set forth above and explained in further detail in the following disclosure. Additionally, each of the processor(s) 206 can possess its own local memory, which also can store program modules, program data, and/or one or more operating systems.

Depending on the exact configuration and type of the device 200, the computer-readable media 208, can include computer storage media and/or communication media.

Computer storage media can include volatile memory, nonvolatile memory, and/or other persistent and/or auxiliary computer storage media, removable and non-removable computer storage media implemented in any method or technology for storage of information such as computer readable instructions, data structures, program modules, or other data. Computer memory is an example of computer storage media. Thus, computer storage media includes tangible and/or physical forms of media included in a device and/or hardware component that is part of a device or external to a device, including but not limited to random-access memory (RAM), static random-access memory (SRAM), dynamic random-access memory (DRAM), phase change memory (PRAM), read-only memory (ROM), erasable programmable read-only memory (EPROM), electrically erasable programmable read-only memory (EEPROM), flash memory, compact disc read-only memory (CD-ROM), digital versatile disks (DVDs), optical cards or other optical storage media, miniature hard drives, memory cards, magnetic cassettes, magnetic tape, magnetic disk storage, magnetic cards or other magnetic storage devices or media, solid-state memory devices, storage arrays, network attached storage, storage area networks, hosted computer storage or any other storage memory, storage device, and/or storage medium that can be used to store and maintain information for access by a computing device.

In at least one example, the computer storage media can include non-transitory computer-readable media. Non-transitory computer-readable media can include volatile and nonvolatile, removable and non-removable tangible, physical media implemented in technology for storage of information, such as computer readable instructions, data structures, program modules, or other data. The computer-readable media 208 is an example of non-transitory computer-readable media. Non-transitory computer-readable media include, but are not limited to, RAM, ROM, EEPROM, flash memory or other memory technology, CD-ROM, DVDs or other optical storage, magnetic cassettes, magnetic tape, magnetic disk storage or other magnetic storage devices, or any other tangible, physical medium which can be used to store the desired information and which can be accessed by the device 200. Any such non-transitory computer-readable media can be part of the device 200.

In contrast, communication media includes computer readable instructions, data structures, program modules, or other data in a modulated data signal, such as a carrier wave, or other transmission mechanism. As defined herein, computer storage media does not include communication media.

The computer-readable media 208 can include one or more modules and data structures including, for example, a communication module 212, a profile application 214, a profile management module 216, and a user interface (UI) module 218. The one or more modules and data structures can be in the form of stand-alone applications, productivity applications, an operating system component, or any other application or software module configured to facilitate the acquisition of profile(s) from service provider(s), as described herein. In some examples, one or more of the modules can be combined into a single module. That is, in some examples, a single module can perform one or more of the functions described below with reference to the communication module 212, the profile application 214, the profile management module 216, and the user interface (UI) module 218.

The communication module 212 can be configured to facilitate communications on behalf of the device 200. That is, the communication module 212 can send and/or receive calls, messages, and/or data on behalf of the device 200. Upon installation (and activation) of a profile associated with a particular service provider, the communication module 212 can facilitate communications via services provided by the particular service provider.

The profile application 214, which can perform the same or similar functions as the profile application 124 described above, can be configured to enable a user to initiate profile acquisition via the device 200. In at least one example, a user can interact with a graphical user interface (GUI) presented via a display of the device 200 to launch the profile application 214, as described below with reference to FIG. 3.

In at least one example, the profile application 214 can determine identification data associated with at least one of the device 200 or an account of a user operating the device 200. For instance, in an example, the profile application 214 can access an identifier associated with the eSIM 202. The identifier can uniquely identify the eSIM 202, as described above. In an additional and/or alternative example, the profile application 214 can prompt a user to input identification data. For instance, the profile application 214 can cause a GUI, as described below with reference to FIG. 4, to be presented via the UI module 218, which prompts the user to input an account identifier. That is, in such an example, if a user has a previously established account with the service provider, the user can input an account identifier (or other identifying information) via the GUI.

In additional and/or alternative examples, the profile application 214 can cause a GUI, as described below with reference to FIG. 5, to be presented via the UI module 218, which prompts the user to input one or more characteristics of a service plan. In some examples, the user can select the one or more characteristics from a provided set of characteristics. In additional and/or alternative examples, the user can input the one or more characteristics via a free form text box or other option that allows the user to specify the one or more characteristics. Non-limiting examples of characteristics can include pricing, payment options, network quality, quantity of data, number of lines, account management, international roaming, etc.

The profile application 214 can send the identification data to one or more servers associated with a service provider. As described above, in at least one example, the identification data can include the identifier and information associated with an account (or soon to be established account) of the user.

In at least one example, the profile application 214 can send a query to one or more servers associated with a discovery service (e.g., discovery server(s) 106) to determine whether the one or more servers associated with the discovery service are aware of a profile that is available for an identifier associated with the device 200 (e.g., the eSIM 202 of the device). That is, the device 200 can query the one or more servers associated with the discovery service to determine whether an associated database is storing an association between the identifier and a service provider. The query can include the identifier. Based on the one or more servers associated with the discovery service determining that an associated database is storing an association between the identifier and the service provider, the profile application 214 can receive a response to the query that includes an address for the service provider associated with the profile to which the identifier is mapped or otherwise associated. As described above, in some examples, the database associated with the discovery service may not have an association between the identifier and the service provider stored. In such examples, the one or more servers associated with the discovery service can send a request for information about associations to a service provider and can receive indication(s) of association(s) responsive to such a request. In such examples, the one or more servers associated with the discovery service can identify an association between the identifier and the service provider and can provide the response to the query as described above.

The profile management module 216 can facilitate the acquisition of a profile from server(s) of a service provider and associate the profile with the eSIM 202. The profile management module 216 can perform the same or similar functions as the local profile assistant and/or the profile management module 126 described above. In at least one example, the profile management module 216 can leverage data received from the one or more servers associated with the discovery service (e.g., access data 130) and can send a request for a profile to server(s) associated with a service provider. That is, the profile management module 216 can send a request for a profile to an address provided by the one or more servers associated with the discovery service. In at least one example, the request can include the identifier.

In response to the request, the profile management module 216 can receive access to the profile 204. As described above, a profile can be one or more data items that collectively represent the profile. In at least one example, server(s) associated with a service provider can provide an access code to the profile management module 216 to establish a secure channel for transmitting the profile from the server(s) to the profile management module 230. In other examples, the server(s) can directly provision the profile to the profile management module 216 without first providing an access code to the profile management module 216.

In at least one example, upon receiving the profile, the profile management module 216 can associate the profile with the eSIM 202. That is, in at least one example, the profile management module 216 can install the profile. In some examples, the profile management module 216 can send an installation result (e.g., success, failure, etc.) to the server(s) associated with the service provider.

In at least one example, the profile management module 216 can access data associated with the eSIM 202 (e.g., data associated with one or more stored profile(s) 204, etc.) to determine whether any restrictions prohibit the installation of the profile. That is, the profile management module 216 can analyze one or more restrictions and can determine whether installing the profile violates any of the restrictions. So long as installing the profile does not violate any of the restrictions, the profile management module 216 can associate the profile with the eSIM 202. However, if the profile management module 216 determines that the profile violates a restriction, the profile management module 216 can refrain from installing the profile.

The UI module 218 can be configured to present data via user interface(s) of the device 200. In at least one example, the UI module 218 can receive data and determine a format for presenting the data via user interface(s) of the device 200. In at least one example, the UI module 218 can receive data and determine how to graphically present the data via a display of the device 200.

In at least one example, the UI module 218 can present a GUI that enables a user to activate the profile application 214. A non-limiting example of such a GUI is provided below with reference to FIG. 3. In an additional and/or alternative example, the UI module 218 can present a GUI that enables a user to input account information. Non-limiting examples of such GUIs are provided below with reference to FIGS. 4 and 5. In at least one example, identification data can be determined based on the input provided via the GUI. In some examples, the UI module 218 can present a GUI to promote an offer (for a service plan). A non-limiting example of such a GUI is provided below with reference to FIG. 6. Furthermore, in at least one example, the UI module 218 can present a GUI to indicate that a profile has been provisioned to the device 200. A non-limiting example of such a GUI is provided below with reference to FIG. 7. Various other GUIs for surfacing information can be imagined.

The radio hardware 210 provides wireless UE capabilities, such as connecting to a base station, a Wi-Fi network, or other wireless networks. The radio hardware 210 can include or be incorporated into processors, ASICs, programmable circuits such as FPGAs, or in other ways.

As described above, the UI module 218 can be configured to present one or more GUIs via a display of the device 200. FIGS. 3-7 illustrate non-limiting examples of such GUIs.

Figure 3:
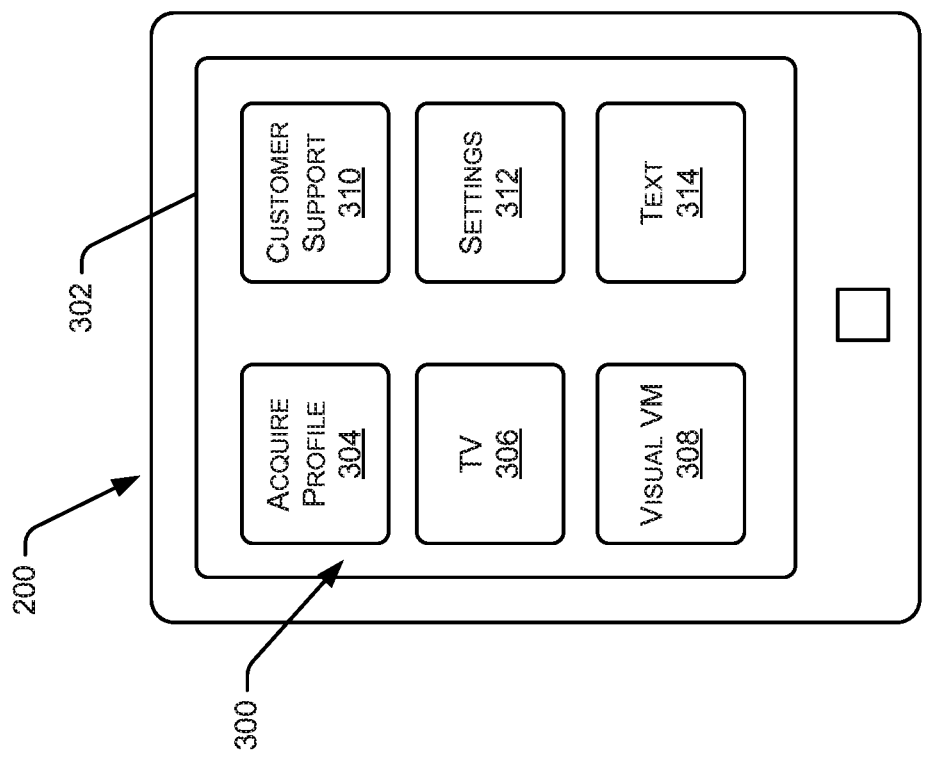
FIG. 3 illustrates an example of a graphical user interface (GUI) configured to enable a user to access an application associated with acquiring a profile for an eSIM of a device.

FIG. 3 illustrates an example of a GUI 300 configured to enable a user to access an application associated with acquiring a profile. In at least one example, the UI module 218 may be configured to present user interface(s) via a display 302 of a device 200. In at least one example, the UI module 218 may generate a GUI 300 and may present the GUI 300 via the display 302 of the device 200. In at least one example, the GUI 300 may be associated with one or more graphical representations (e.g., 304-314). Each of the graphical representations may be associated with different applications (e.g., features and/or functionalities). In at least one example, a graphical representation may be associated with a control, the actuation of which activates a corresponding application. For instance, graphical representation 304 may be associated with an application that enables a user to acquire a profile via the device 200 (e.g., profile application 214). As described above, a user may interact with the GUI 300 to actuate the control corresponding to the application for acquiring a profile and based at least in part on determining actuation of the control, the device 200 may launch the application. By launching the application, the device 200 can enable a user to input identification information, as described below. Additionally and/or alternatively, by launching the application, the device 200 can query a discovery service to determine whether the discovery service is aware of any profiles for an eSIM of the device 200 and/or can initiate a request for a profile to be sent from one or more servers of a service provider, as described above. That is, by launching the application, the device 200 can acquire a profile from a service provider, assuming a profile is available and has been previously mapped to, or associated with, the identifier.

Figure 4:
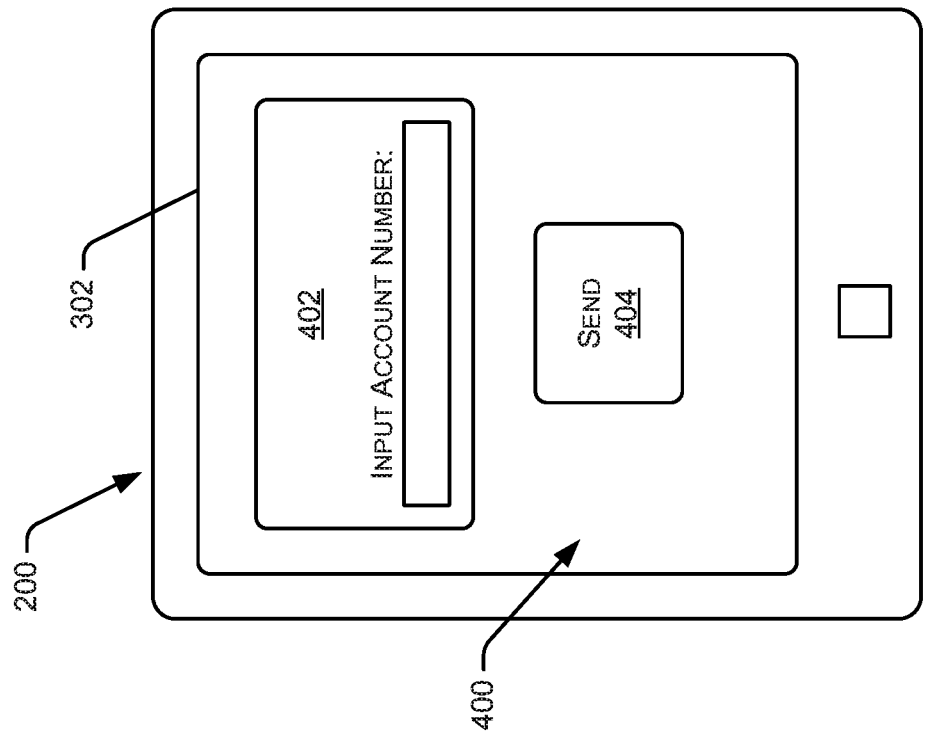
FIGS. 4 and 5 illustrate examples of GUIs configured to enable a user to input account information.
Figure 5:
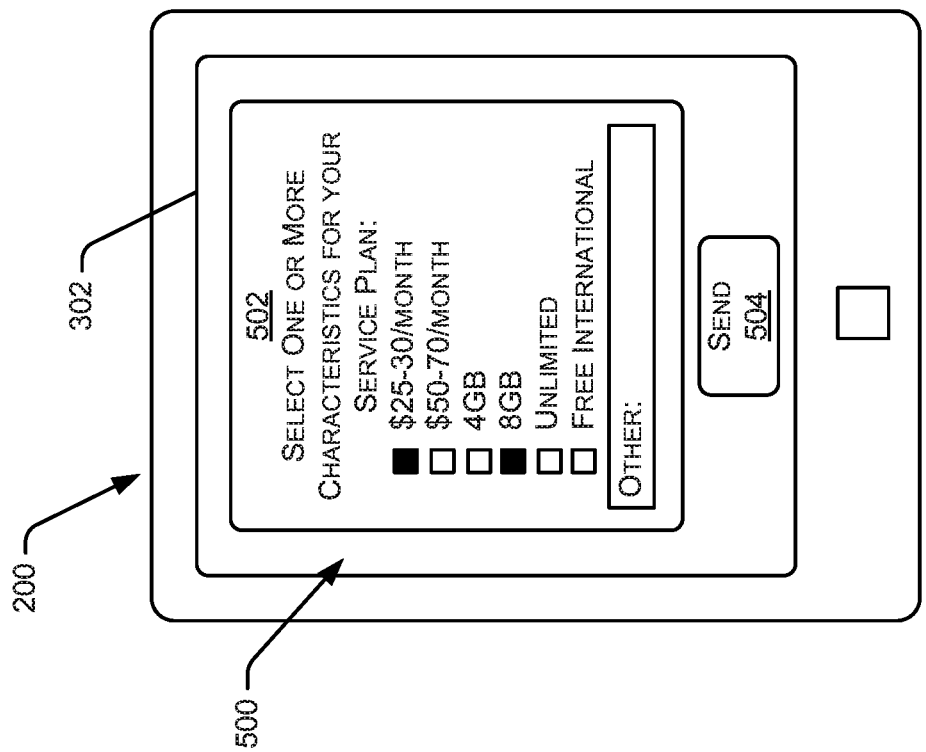
Figure 7:
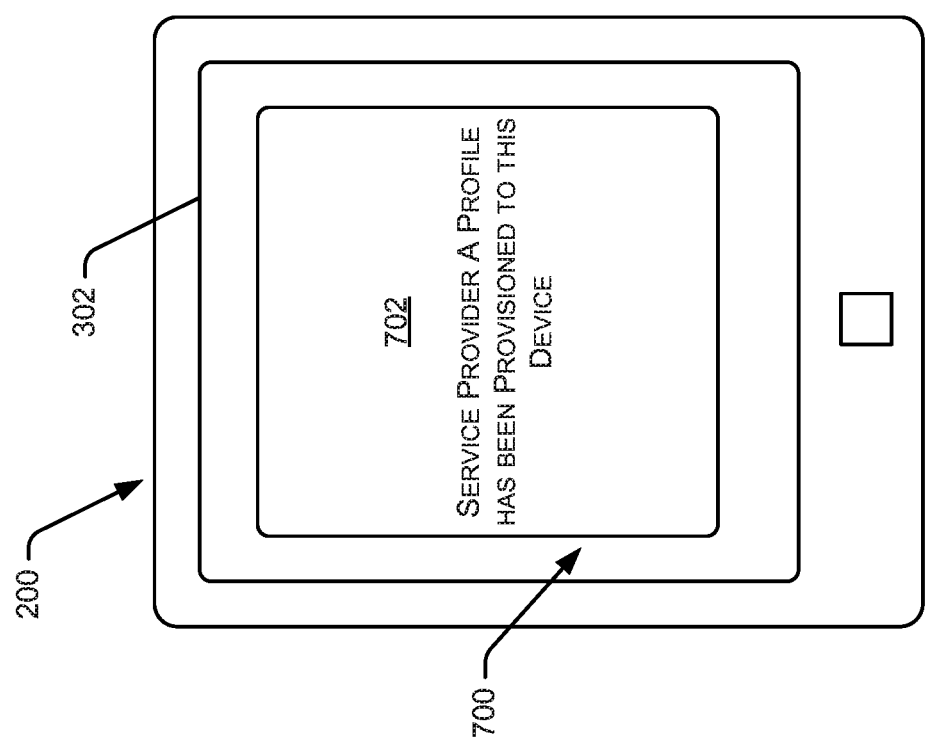
FIG. 7 illustrates an example of a GUI configured to indicate that a profile has been provisioned to a device.

FIGS. 4 and 5 illustrate examples of GUIs that enable a user to input account information. For instance, in FIG. 4, a user can input an account identifier via GUI 400, for instance via a region 402 of the GUI 400. The GUI 400 can also include a control 404, the actuation of which causes the device 200 to send the account identifier (and other identification data) to server(s) associated with a service provider. In an additional and/or alternative example, as illustrated in FIG. 5, a user can input one or more characteristics for a service plan via GUI 500. For instance, a region 502 of the GUI 500 can present a set of characteristics from which a user can select one or more characteristics for a service plan. Additionally and/or alternatively, the region 502 can include a free-form text input for a user to input additional characteristic(s) that are not presented in the set of characteristics. The GUI 500 can also include a control 504, the actuation of which causes the device 200 to send data representing the one or more characteristics (and other identification data) to server(s) associated with a service provider.

Figure 6:
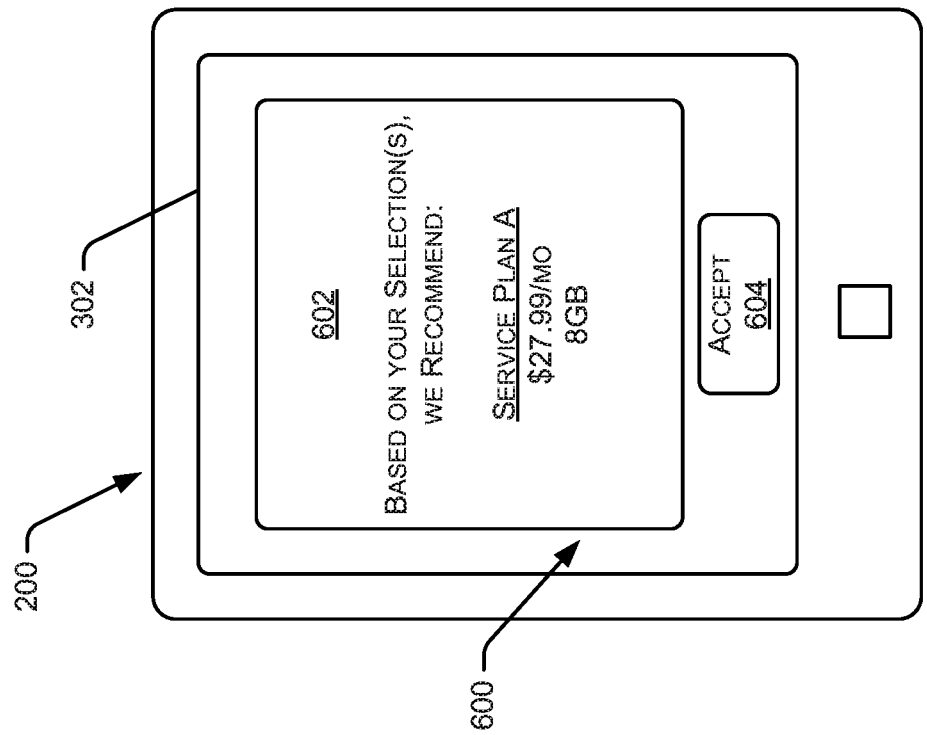
FIG. 6 illustrates an example of a GUI configured to promote an offer (for a service plan) via a display of a device.

FIG. 6 illustrates a GUI 600 for promoting an offer (for a service plan) to a user. The GUI 600 can include a region 602 that presents a particular offer via the display 302. In at least one example, the offer can be selected by the server(s) associated with the service provider based on the characteristic(s) selected by the user (e.g., via interaction with GUI 500). The GUI 600 can include a control 604, the actuation of which causes the device 200 to send an indication that the user accepts the offer to server(s) associated with a service provider. Additionally or alternatively, The GUI 600 can include another control (not illustrated), the actuation of which causes the device 200 to send an indication that the user declines the offer to server(s) associated with a service provider. In some examples, the GUI 600 can include more than one offer (e.g., multiple service plans), which may be available from one or more service providers. In such examples, a user can select one of the service plans via the GUI 600.

Additionally, the UI module 218 can present a GUI 700 to inform the user that a profile has been provisioned to the device 200. The GUI 700 can include a region 702 that informs a user that a particular profile has been provisioned to the device 200. In some examples, the GUI 700 can include additional details associated with the profile (e.g., account information, rate plan information, restrictions, etc.).

FIGS. 3-7 illustrate non-limiting examples of user interfaces that may be presented via a display of a device. The graphical elements depicted are provided only as examples and are not limited to such designs and/or configurations. Additional and/or alternative configurations and/or presentations may be imagined.

Figure 8:
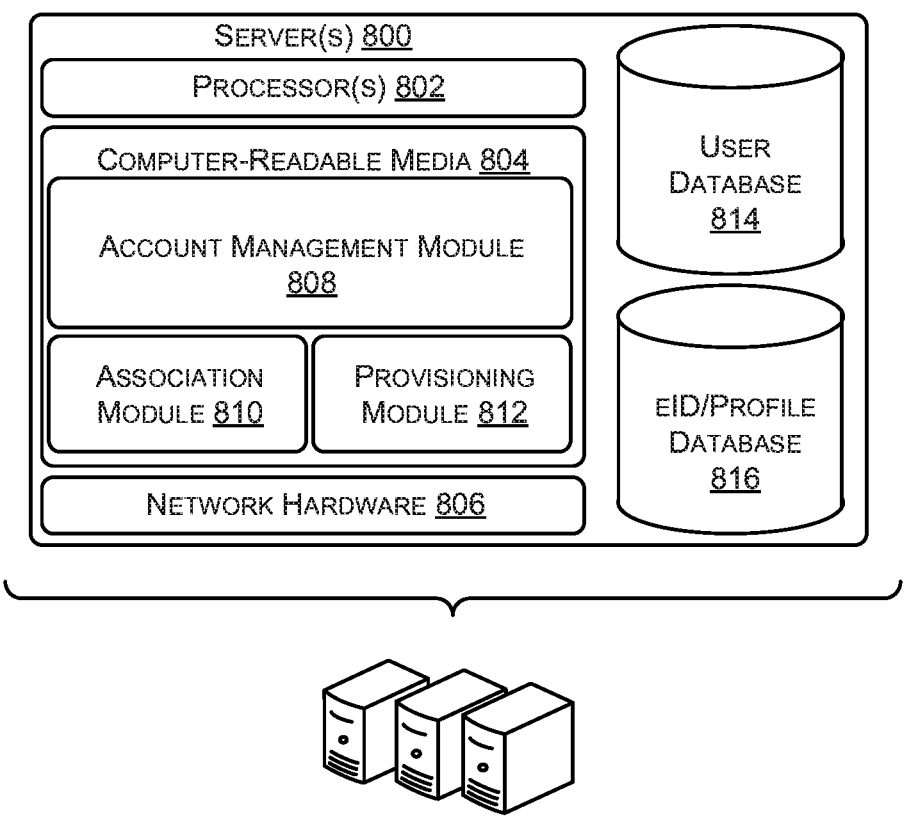
FIG. 8 illustrates an example of one or more servers for provisioning access to a service provider via profile management.

FIG. 8 illustrates an example one or more servers 800 for provisioning access to a service provider via profile management. In at least one example, server(s) 800 can correspond to server(s) 104 described above with reference to FIG. 1. As described above, in at least one example, the server(s) 800 can be associated with a service provider, such as a telecommunication service provider.

In at least one example, the server(s) 800 can be any type of server, such as a network-accessible server. In various examples, each of the server(s) 800 can be associated with one or more processors 802, computer-readable media 804, and network hardware 806. The processor(s) 802 can have the same and/or similar structure and/or function as the processor(s) 206, described above.

Depending on the exact configuration and type of the server(s) 800, the computer-readable media 804 can include computer storage media and/or communication media. The computer-readable media 804 can have the same and/or similar structure and/or function as the computer-readable media 208, described above. The computer-readable media 804 can include one or more modules and data structures including, for example, an account management module 808, an association module 810, and/or a provisioning module 812. The one or more modules and data structures can be in the form of stand-alone applications, productivity applications, an operating system component, or any other application or software module having data items that facilitate provisioning access to service(s) offered by an alternative service provider, as described herein.

The account management module 808 can manage accounts of users. As described above, a service provider can provide services to one or more devices that subscribe to such services. The scope of the services can be defined by terms of an agreement (e.g., service plan) that is used to establish a relationship (e.g., an account) between a user of a device and the service provider. Each account can be associated with an account identifier which can represent a user in a user database 814.

In at least one example, a user can have a pre-established service plan with a service provider. In such examples, the user can interact with a device (e.g., device 200) to input an account identifier and/or other identification information, which can be used to generate identification data, as described above. The account management module 808 can receive identification data from the device. If the account identifier is not included in the identification data, the account management module 808 can perform a look-up or otherwise search the user database 814 to determine an account identifier associated with the identification data. Based at least in part on determining the account identifier, the account management module 808 can access the user database 814 to identify an account of a user based on the account identifier.

In an alternative example, a user can desire to establish a service plan with a service provider and/or update an existing service plan. In such an example, the user can provide input identifying one or more characteristics for the service plan. For instance, the user can interact with a GUI (e.g., GUI 500) to provide input identifying the one or more characteristics for the service plan. As described above, such data can be used to generate identification data. The account management module 808 can receive the identification data, which specifies one or more characteristics of a service plan, and can identify one or more service plans that are associated with the one or more characteristics. For instance, in at least one example, one or more characteristics, or groups of one or more characteristics, can be mapped to, or otherwise associated with, a particular service plan. The account management module 808 can analyze the identification data and corresponding service plan(s) to which the one or more characteristics identified in the identification data map to particular service plan(s), and can determine a service plan for the user. That is, in at least one example, the account management module 808 can determine a relevance score between the one or more characteristics associated with the identification data and individual of the one or more service plans. As a non-limiting example, a service plan associated with multiple characteristics identified by the user can be associated with a relevance score above a threshold indicating that the service plan is relevant to the user. As another non-limiting example, a service plan associated with one characteristic identified by the user can be associated with a relevance score below a threshold indicating that the service plan is not relevant to the user.

In some examples, more than one service plan may be relevant to the user (e.g., be associated with a relevance score above a threshold). In such examples, the account management module 808 can rank the service plans (most relevant to least relevant as determined by respective relevance scores, for example) and can select a top-ranking service plan or one or more top-raking service plans. In other examples, the account management module 808 can select a service plan with a relevance score above a specified threshold or multiple service plans having relevance scores above the specified threshold.

In such an example, the account management module 808 can send an offer for a particular service plan to a device operated by a user (e.g., device 200). The device can present the offer (e.g., via GUI 600) and the user can opt to accept or decline the offer. In some examples, if more than one service plan is available in view of the specified one or more characteristics, the account management module 808 can automatically select one of the service plans. For instance, the account management module 808 can select a top-ranking service plan or a service plan having a relevance score above a specified threshold. Or, the account management module 808 can send an offer for multiple service plans to the device and a user can select one of the multiple service plans.

Responsive to a user accepting an offer for a service plan, the account management module 808 can generate an account and account identifier for the user. The account management module 808 can add the account identifier to the user database 814. In some examples, the account identifier can be mapped to, or otherwise associated with, additional identification data associated with the user and/or device(s) operated by the user. For instance, in at least one example, the account identifier can be mapped to an identifier of an eSIM of a device associated with the account, data indicating a service plan associated with the account, etc.

In at least one example, the account management module 808 can detect a presence of a new device. That is, the account management module 808 can identify a new device is using (or attempting to use) services provided by the service provider. The account management module 808 can determine whether the new device is associated with an eSIM. Based on determining that the new device is associated with the eSIM, the account management module 808 can send an offer for services to the new device. If a user of the new device accepts the offer, the account management module 808 can generate an account and account identifier for the user. The account management module 808 can add the account identifier to the user database 814. In some examples, the account identifier can be mapped to, or otherwise associated with, additional identification data associated with the user and/or device(s) operated by the user.

The association module 810 can be configured to map, or otherwise associate, identifiers and profiles. The association module 810 can correspond to association module 112 described above with reference to FIG. 1. In at least one example, each service plan can correspond to a particular profile. In at least one example, the association module 810 can map, or otherwise associate, an identifier (e.g., eID) that is particular to an eSIM of a device with a particular profile corresponding to a service plan associated with the device in an eID/profile database 816. That is, the association module 810 can receive an indication of a particular profile that corresponds to a service plan associated with a device and the eID for the eSIM associated with the device. Accordingly, the association module 810 can map, or otherwise associate, the particular profile and the eID in the eID/profile database 816. Additionally, in at least one example, the association module 810 can provide an indication of the association between the identifier and the profile to the discovery server(s), as described above with reference to FIG. 1. In some examples, as described above, the association module 810 can provide the indication responsive to a request for information about associations(s) determined by the service provider.

The provisioning module 812 can be configured to provision profile(s) to device(s). In at least one example, the provisioning module 812 can correspond to provisioning module 114, described above with reference to FIG. 1. In an example, the provisioning module 812 can receive a request for a profile from a device. The request can include an identifier corresponding to an eSIM of the device. Responsive to receiving the request, the provisioning module 812 can access the eID/profile database 816 to retrieve a profile that is mapped to, or otherwise associated with, the identifier. Based at least in part on retrieving the profile, the provisioning module 812 can send the profile to the device. In at least one example, provisioning module 812 can provide an access code to the device to establish a secure channel for transmitting the profile from the server(s) 800 to the device. Responsive to receiving the access code from the device, the provisioning module 812 can transmit the profile to the device. In other examples, the provisioning module 812 can directly provision the profile to the device without utilizing the access code.

The network hardware 806 can provide wired or wireless networking capabilities to the server(s) 800. The network hardware 806 can include or be incorporated into processors, ASICs, programmable circuits such as FPGAs, or in other ways.

The server(s) 800 can be associated with one or more databases, such as a user database 814 and an eID/profile database 816. In some examples, the database(s) can be communicatively coupled to the server(s) 800. In other examples, the database(s) can be integrated with the server(s) 800. The database(s) can store data such that it can be updated and/or accessible. As described above, the user database 814 can store data indicative of accounts of users. In at least one example, an account identifier representative of a user in the user database 814 can be mapped to, or otherwise associated with, additional identification data, as described above. The eID/profile database 816 can store data indicative of associations between identifiers of eSIMs of devices (e.g., eIDs) and profiles that correspond to particular service plans.

FIGS. 9-13 describe example processes for facilitating device-enabled profile acquisition. The example processes are described in the context of the environments of FIGS. 1-8, but are not limited to those environments.

The processes described below in association with FIGS. 9-13 can be implemented in hardware, software, or a combination thereof. In the context of software, the operations represent computer-executable instructions stored on one or more computer-readable storage media that, when executed by one or more processors, perform the recited operations. Generally, computer-executable instructions include routines, programs, objects, components, data structures, and the like that perform particular functionalities or implement particular abstract data types. In other embodiments, hardware components perform one or more of the operations. Such hardware components can include or be incorporated into processors, ASICs, programmable circuits such as FPGAs, or in other ways. The order in which the operations are described is not intended to be construed as a limitation, and any number of the described operations can be combined in any order and/or in parallel to implement the processes.

As described herein a service provider can provide services and can provision profiles to devices to enable access to such services. Actions attributed to a service provider herein can be performed by one or more servers associated with the service provider. Additionally, a discovery service can facilitate profile provisioning by communicating with one or more service providers and/or devices. Actions attributed to the discovery service herein can be performed by one or more servers (e.g., discovery server(s)) associated with the discovery service.

Figure 9:
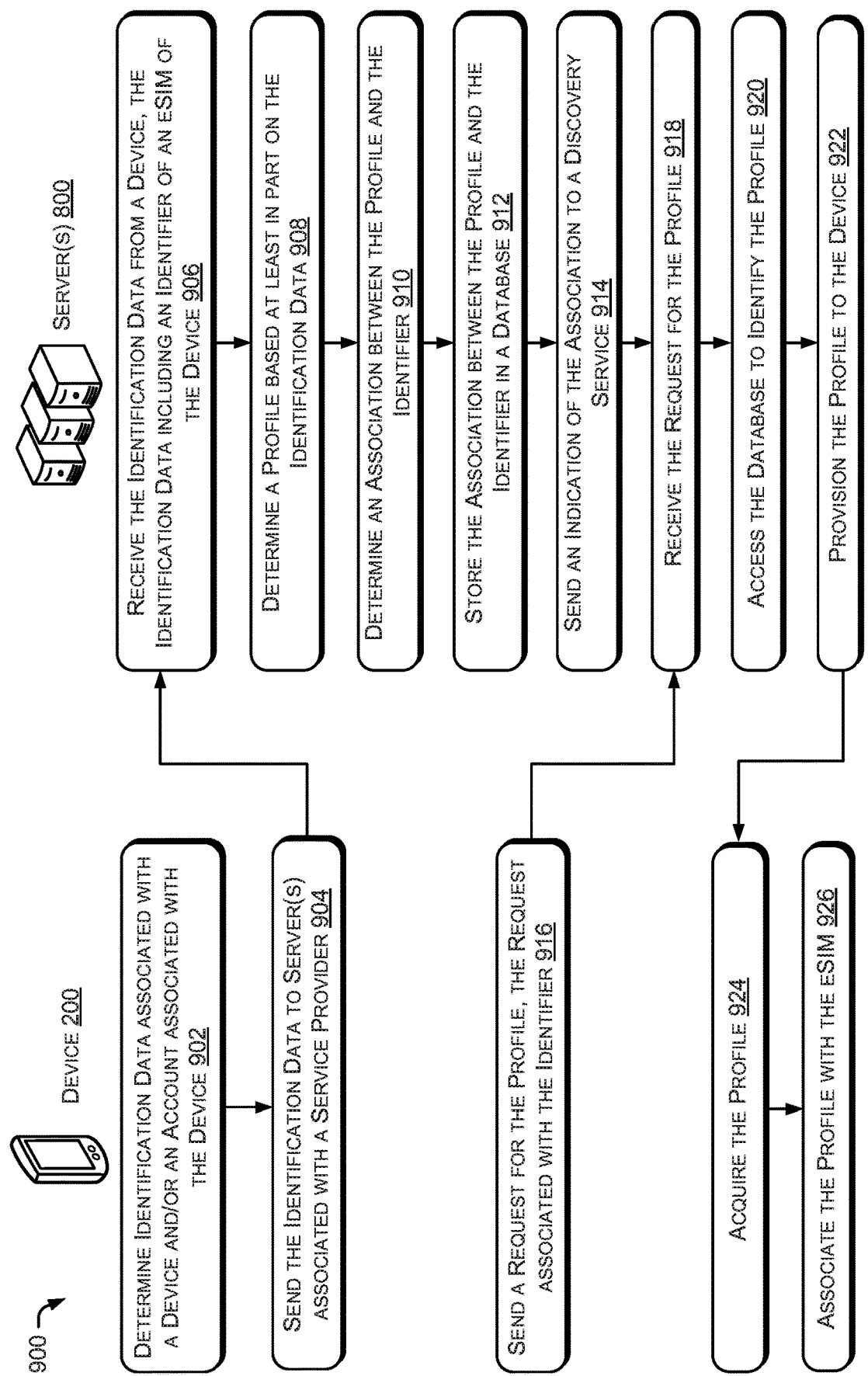
FIG. 9 illustrates an example process for provisioning access to a service provider via profile management.

FIG. 9 illustrates an example process 900 for provisioning access to a service provider via profile management.

Block 902 illustrates determining identification data associated with a device and/or an account associated with the device. In at least one example, a user can launch the profile application 214, for instance, via a GUI, to initiate acquisition of profile. In at least one example, responsive to launching the profile application 214, the profile application 214 can determine identification data associated with at least one of the device 200 or an account of a user operating the device 200. For instance, in an example, the profile application 214 can access an identifier associated with the eSIM 202. The identifier can uniquely identify the eSIM 202, as described above.

In an additional and/or alternative example, the profile application 214 can prompt a user to input identification data. For instance, the profile application 214 can cause a GUI, as described above, to be presented via the UI module 218 which prompts the user to input an account identifier. That is, in such an example, if a user has a previously established account with a service provider, the user can input an account identifier (or other identifying information) via the GUI. In additional and/or alternative examples, the profile application 214 can cause a GUI, as described above, to be presented via the UI module 218 which prompts the user to input one or more characteristics of a service plan.

In at least one example, the identification data can include an identifier of an eSIM associated with a device, an account identifier, and/or data associated with one or more characteristics of a service plan. The profile application 214 can send the identification data to servers associated with a service provider (e.g., server(s) 800), as illustrated in block 904.

Block 906 illustrates receiving the identification data from the device, the identification data including an identifier of an eSIM of the device. In at least one example, the account management module 808 can receive identification data from the device 200.

Block 908 illustrates determining a profile based at least in part on the identification data. Based at least in part on determining an account identifier associated with the identification data, the account management module 808 can access the user database 814 to identify an account of a user based on the account identifier. As described above, the account can be associated with a service plan. Based at least in part on identifying a service plan associated with the account, the association module 810 can determine a profile corresponding to the service plan. Additional details associated with determining a profile are described below with reference to FIG. 10.

Block 910 illustrates determining an association between the profile and the identifier. In at least one example, the association module 810 can determine an association between an identifier (e.g., eID) that is particular to the eSIM 202 of the device 200 and a particular profile corresponding to a service plan associated with the device 200. In at least one example, the association module 810 can store the association between the identifier (e.g., eID) that is particular to the eSIM 202 of the device 200 with the particular profile corresponding to the service plan associated with the device 200 in a database, as illustrated in block 912. That is, the association module 810 can receive an indication of a particular profile that corresponds to a service plan associated with the device 200 and the eID for the eSIM 202 associated with the device 200, and can map, or otherwise associate, the eID and the particular profile in the eID/profile database 816.

Block 914 illustrates sending an indication of the association to a discovery service. In at least one example, the association module 810 can provide an indication of the association between the identifier and the profile to the discovery server(s), as described above with reference to FIG. 1. In some examples, as described above, the association module 810 can provide the indication responsive to a request for information about associations(s) determined by the service provider. Additional details associated with communications involving the discovery service are described below with reference to FIG. 11.

Block 916 illustrates sending a request for the profile, the request associated with the identifier. In at least one example, the profile management module 216 can receive data indicating a service provider that has a profile ready to be provisioned to the device 200 from the one or more servers associated with the discovery service. The profile management module 216 can leverage the data to send a request for the profile to the server(s) 800. That is, the profile management module 216 can send a request for a profile to an address provided by the discovery service. In at least one example, the request can include the identifier. The server(s) 800 can receive the request, as illustrated in block 918. In an example, the provisioning module 812 can receive a request for a profile from a device, as described above.

Block 920 illustrates accessing the database to identify the profile. Responsive to receiving the request, the provisioning module 812 can access the eID/profile database 816 to retrieve a profile that is mapped to, or otherwise associated with, the identifier.

Block 922 illustrates provisioning the profile to the device. Based at least in part on retrieving the profile, the provisioning module 812 can send the profile to the device 200. In at least one example, provisioning module 812 can provide an access code to the device to establish a secure channel for transmitting the profile from the server(s) 800 to the device 200. Responsive to receiving the access code from the device 200, the provisioning module 812 can transmit the profile to the device 200. In other examples, the provisioning module 812 can directly provision the profile to the device 200 without utilizing the access code.

Block 924 illustrates acquiring the profile. In response to sending the request, the profile management module 216 can receive access to the profile 204. As described above, a profile can be one or more data items that collectively represent the profile. In at least one example, the server(s) 800 can provide an access code to the profile management module 216 to establish a secure channel for transmitting the profile from the server(s) 800 to the profile management module 216. In such an example, the profile management module 216 can provide the access code to the server(s) 800 to download the profile. In other examples, the server(s) 800 can directly provision the profile to the profile management module 216 without first providing an access code to the profile management module 216.

Block 926 illustrates associating the profile with the eSIM. In at least one example, upon receiving the profile, the profile management module 216 can associate the profile with the eSIM 202. That is, in at least one example, the profile management module 216 can install the profile. In some examples, the profile management module 216 can send an installation result (e.g., success, failure, etc.) to the server(s) 800.

In at least one example, the profile management module 216 can access data associated with the eSIM 202 (e.g., data associated with one or more stored profile(s) 204, etc.) to determine whether any restrictions prohibit the installation of the profile prior to installing the profile. Additional details associated with associating the profile with the eSIM are described below with reference to FIG. 12.

Figure 10:
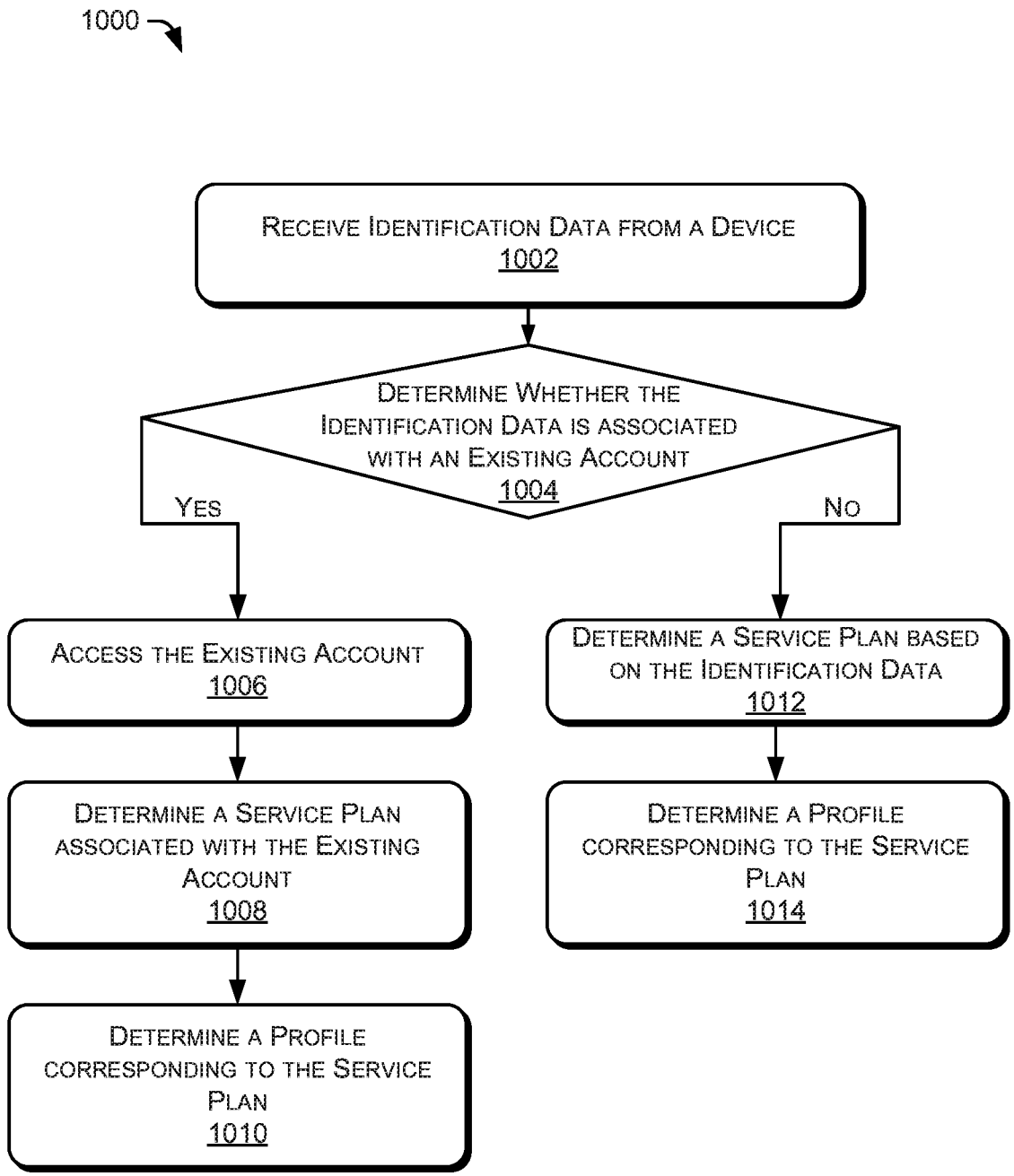
FIG. 10 illustrates an example process for determining a profile based on identification data.

FIG. 10 illustrates an example process 1000 for determining a profile based on identification data.

Block 1002 illustrates receiving identification data from a device. The account management module 808 can receive identification data from the device 200, as described above. In some examples, the identification data can include an account identifier identifying a preexisting account of a user. In other examples, the identification data can include identification information that can be used to determine an account identifier identifying a preexisting account of a user. In alternative examples, the identification data can include data identifying one or more characteristics of a service plan. The one or more characteristics can be used to establish a new account and/or modify an existing account.

Block 1004 illustrates determining whether the identification data is associated with an existing account. In at least one example, the account management module 808 can analyze the identification data to determine whether the identification data includes an account identifier. If the account identifier is not included in the identification data, the account management module 808 can perform a look-up or otherwise search the user database 814 to determine an account identifier associated with the identification data. In at least one example, an account identifier can indicate the presence of an existing account.

Based at least in part on determining that the identification data is associated with an existing account, the account management module 808 can access the existing account, as illustrated in block 1006. Based at least in part on determining the account identifier, the account management module 808 can access the user database 814 to identify an account of a user based on the account identifier. In at least one example, the account can be mapped to, or otherwise associated with, data indicative of a service plan. Based on accessing the existing account, the account management module 808 can determine a service plan associated with the existing account, as illustrated in block 1008, and determine a profile corresponding to the service plan, as illustrated in block 1010. As described above, each service plan can have a particular profile to which it corresponds. Accordingly, based on determining which service plan is associated with the existing account, the account management module 808 can determine the profile corresponding to the service plan.

Based at least in part on determining that the identification data is not associated with an existing account, the account management module 808 can determine a service plan based on the identification data, as illustrated in block 1012. In at least one example, a user can desire to establish a service plan with a service provider. In such an example, the identification data may not be associated with an account identifier and/or identification data that can be used to identify an account (because an account does not exist). In such an example, the identification data can include one or more characteristics for the service plan, as specified by a user. For instance, the user can interact with a GUI (e.g., GUI 500) to provide input identifying the one or more characteristics for the service plan. As described above, such data can be used to generate identification data.

The account management module 808 can receive the identification data, which specifies one or more characteristics of a service plan, and can identify one or more service plans that are associated with the one or more characteristics, as described above. In such an example, the account management module 808 can send an offer for a particular service plan to a device operated by a user (e.g., device 200). The device can present the offer (e.g., via GUI 600) and the user can opt to accept or decline the offer. In some examples, if more than one service plan is available in view of the specified one or more characteristics, the account management module 808 can automatically select one of the service plans, as described above. Or, the account management module 808 can send an offer for multiple service plans to the device and a user can select one of the multiple service plans.

Responsive to a user accepting an offer for a service plan, the account management module 808 can generate an account and account identifier for the user. The account management module 808 can add the account identifier to the user database 814. In some examples, the account identifier can be mapped to, or otherwise associated with, additional identification data associated with the user and/or device(s) operated by the user.

Additionally, based at least in part on establishing an account and a service plan associated with the account, the account management module 808 can determine a profile corresponding to the service plan, as illustrated in block 1014.

Figure 11:
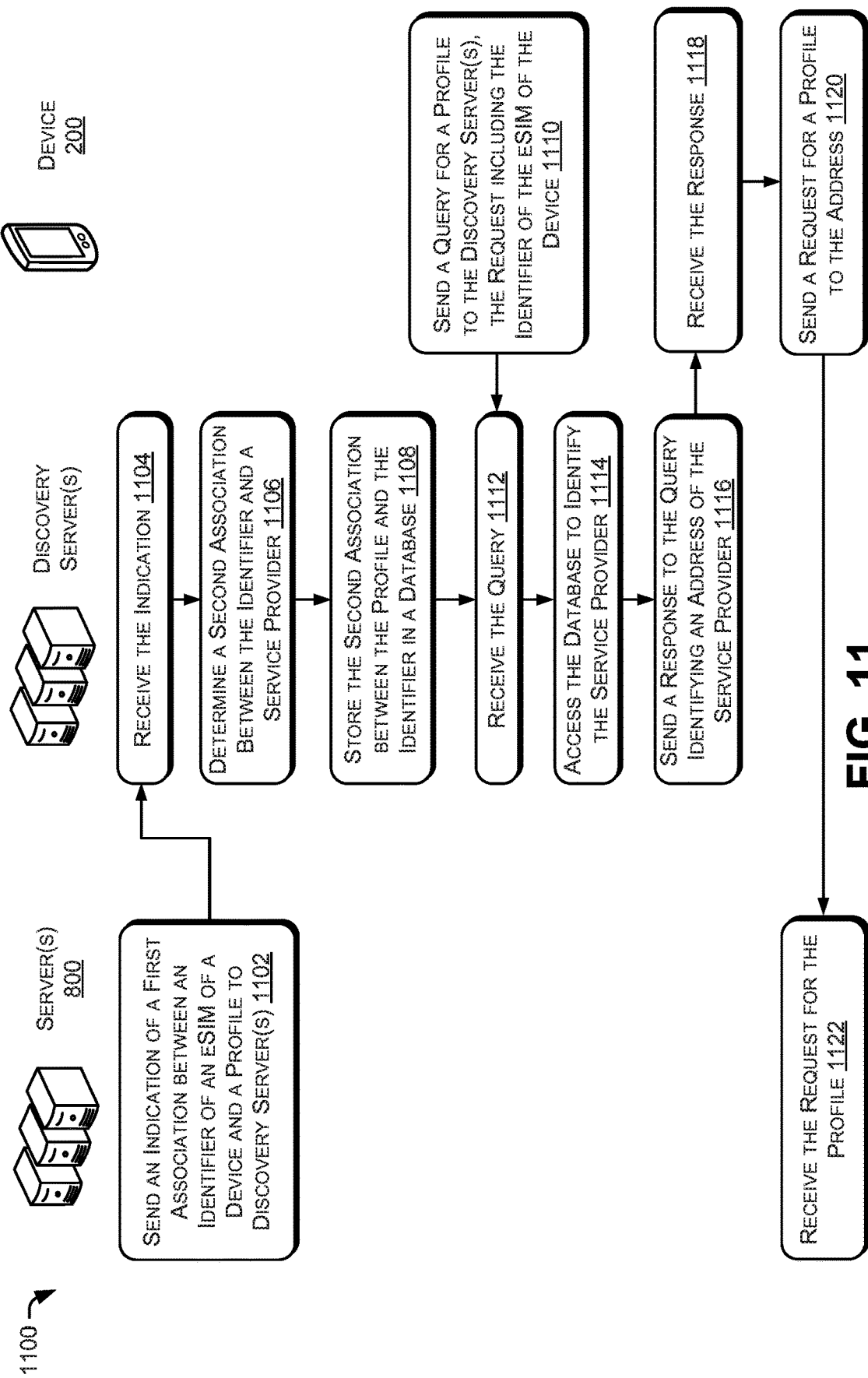
FIG. 11 illustrates an example process for provisioning access to a service provider via profile management.

FIG. 11 illustrates an example process 1100 for provisioning access to a service provider via profile management. As described above with reference to FIG. 9, in at least one example, the server(s) 800 can send indication(s) of association(s) to a discovery service.

Block 1102 illustrates sending an indication of a first association between an identifier of an eSIM of a device and a profile to discovery server(s). As described above, in at least one example, the association module 810 can provide an indication of the association between the identifier and the profile to the discovery server(s), as described above with reference to FIG. 1. In some examples, as described above, the association module 810 can provide the indication responsive to a request for information about associations(s) determined by the service provider.

Block 1104 illustrates receiving the indication. In at least one example, the discovery server(s) can receive the indication.

Block 1106 illustrates determining an association between the identifier and a service provider. Based at least in part on receiving the indication, the discovery server(s) can analyze the indication to determine the service provider that sent the indication. Based at least in part on determining which service provider sent the indication, the discovery server(s) can determine an association between the identifier and the service provider.

Block 1108 illustrates storing a second association between the profile and the identifier in a database. In at least one example, the discovery server(s) can be associated with a database (e.g., eID/service provider database 120) that stores previously provided associations between identifiers and service providers. The discovery server(s) can store the association between the identifier and the service provider in the database.

Block 1110 illustrates sending a query for a profile to the discovery server(s), the request including the identifier of the eSIM of the device. In at least one example, the profile application 214 can send a query to the discovery server(s) to determine whether the discovery server(s) are aware of a profile that is available for the identifier. That is, the device 200 can query the discovery server(s) to determine whether an associated database is storing an association between the identifier and a service provider. The query can include the identifier.

Block 1112 illustrates receiving the query. The discovery server(s) can receive the query and can access the database to determine whether the identifier is mapped to, or otherwise associated with, an indication of a service provider, as illustrated in block 1114. Based at least in part on determining that the identifier is mapped to, or otherwise associated with, a service provider, the discovery server(s) can send a response to the query identifying an address of the service provider, as illustrated in block 1116. That is, the service provider can be associated with an address. The discovery server(s) can generate a response that includes the address and can send the response to the device 200.

Block 1118 illustrates receiving the response. Based on the discovery server(s) determining that an associated database is storing an association between the identifier and the service provider, the profile application 214 can receive the response to the query that includes an address for the service provider associated with the profile to which the identifier is mapped or otherwise associated.

Block 1120 illustrates sending a request for a profile to the address. In at least one example, the profile management module 216 can utilize the address to send a request for a profile to the server(s) 800. That is, the profile management module 216 can send a request for a profile to an address provided via the response. In at least one example, the request can include the identifier.

Block 1122 illustrates receiving the request for the profile. As described above with reference to FIG. 9, in an example, the provisioning module 812 can receive a request for a profile from a device. The request can include the identifier. Responsive to receiving the request, the provisioning module 812 can access the eID/profile database 816 to retrieve a profile that is mapped to, or otherwise associated with, the identifier. Based at least in part on retrieving the profile, the provisioning module 812 can send the profile to the device 200.

Figure 12:
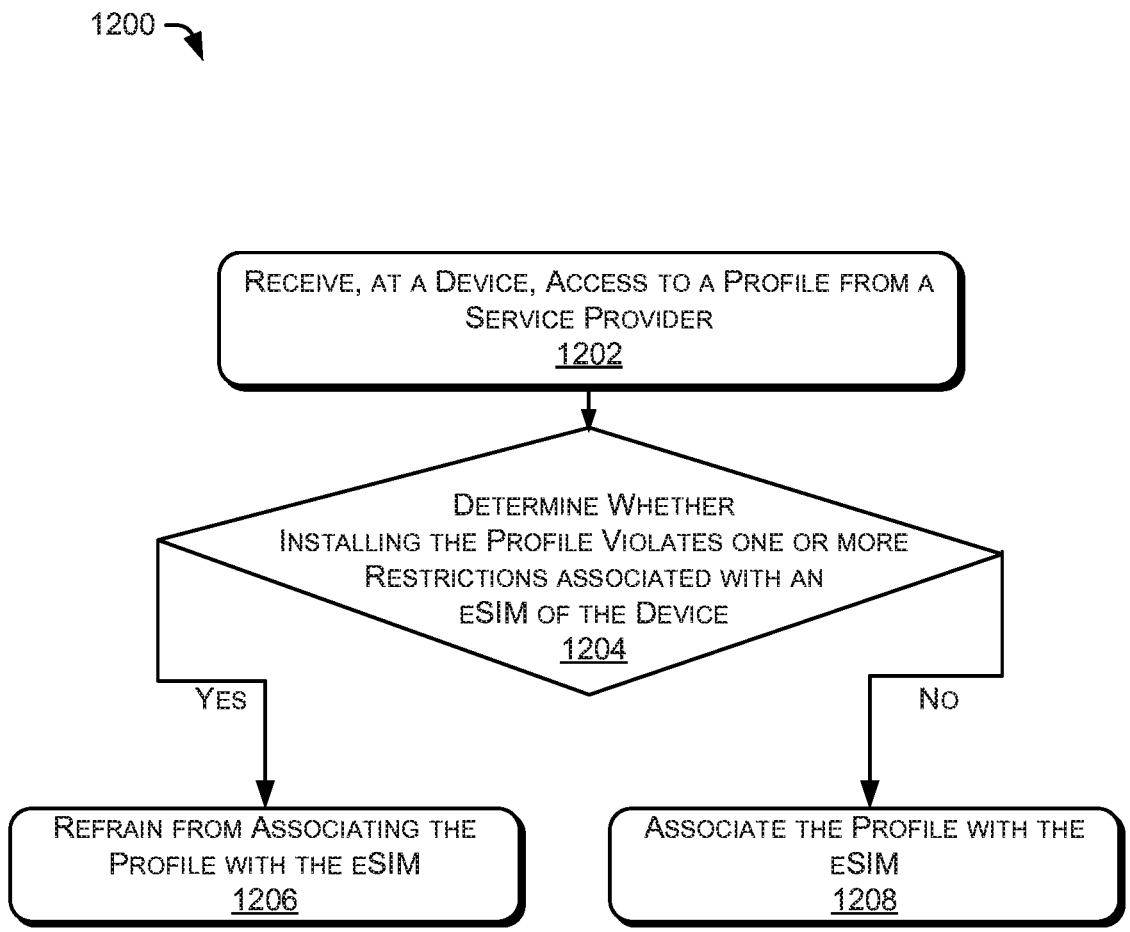
FIG. 12 illustrates an example process for installing a profile.

FIG. 12 illustrates an example process 1200 for installing a profile.

Block 1202 illustrates receiving, at a device, access to a profile from a service provider. As described above, responsive to sending a request to server(s) associated with a service provider (e.g., server(s) 800), the profile management module 216 can receive access to a profile 204. As described above, a profile can be one or more data items that collectively represent the profile. In at least one example, the server(s) associated with a service provider can provide an access code to the profile management module 216 to establish a secure channel for transmitting the profile from the server(s) associated with the service provider to the profile management module 230. In other examples, the server(s) can directly provision the profile to the profile management module 216 without first providing an access code to the profile management module 216.

Block 1204 illustrates determining whether installing the profile violates one or more restrictions associated with an eSIM of the device. As described above, the eSIM 202 of the device 200 can be associated with one or more profiles 204. The one or more profiles 204 can be associated with data that indicates account information (e.g., subscription key, identity and/or service plan profiles, etc.), restrictions, etc. In at least one example, the one or more restrictions can indicate that a profile cannot be removed from the device 200, that a profile cannot be deactivated, etc. In at least one example, the profile management module 216 can access data associated with the eSIM 202 (e.g., data associated with one or more stored profile(s) 204, etc.) to determine whether any restrictions prohibit the installation of the profile. That is, the profile management module 216 can analyze one or more restrictions and can determine whether installing the profile violates any of the restrictions.

Block 1206 illustrates refraining from associating the profile with the eSIM. Based at least in part on determining that the profile violates a restriction, the profile management module 216 can refrain from installing the profile.

Block 1208 illustrates associating the profile with the eSIM. Based at least in part on determining that installing the profile does not violate any of the restrictions, the profile management module 216 can associate the profile with the eSIM 202. That is, the profile management module 216 can install the profile. Accordingly, the device 200 can access services associated with the service provider that provisioned the profile.

Figure 13:
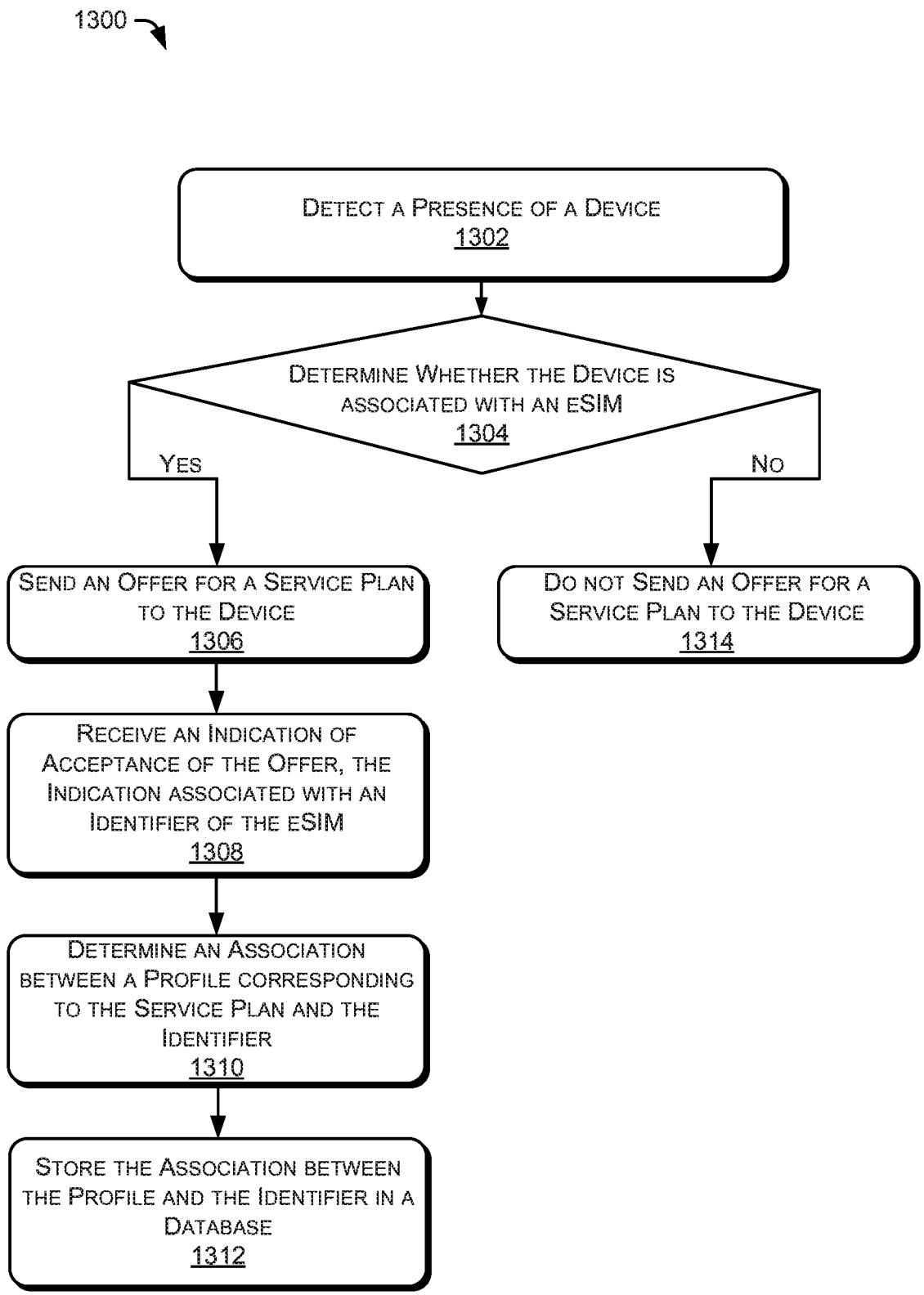
FIG. 13 illustrates an example process for provisioning access to a service provider via profile management.

FIG. 13 illustrates an example process 1300 for provisioning access to a service provider via profile management, for example via a service-provider-push offering to an eSIM capable device.

Block 1302 illustrates detecting a presence of a device. In at least one example, the account management module 808 can detect a presence of a device. That is, the account management module 808 can identify a device is using (or attempting to use) services provided by the service provider. In at least one example, the account management module 808 can utilize information received from an access node (e.g., Wi-Fi access point) that indicates a presence of a device based on device identification performed by the access node. In such an example, the access node can detect the device identity and can communicate the device identity to the account management module 808.

Block 1304 illustrates determining whether the device is associated with an eSIM. In at least one example, the account management module 808 can utilize information received from an access node (e.g., Wi-Fi access point) that indicates a presence of a device and an indication that the device is eSIM capable. In such an example, the access node can detect the device identity and eSIM capability, and can communicate such information to the account management module 808. In at least one example, the eSIM capability can be implicit in the device identity.

Block 1306 illustrates sending an offer for a service plan to the device. Based on determining that the device is associated with the eSIM (i.e., eSIM capable), the account management module 808 can send an offer for services to the device. In some examples, the account management module 808 can send multiple offers to the device.

Block 1308 illustrates receiving an indication of acceptance of the offer, the indication associated with an identifier of the eSIM. If a user of the device accepts the offer (e.g., by interaction with a GUI, or otherwise), the account management module 808 can receive an indication that the user accepts the offer. Responsive to receiving the indication of acceptance, the account management module 808 can generate an account for the user and determine an account identifier for the account. The account management module 808 can add the account identifier to the user database 814. In some examples, the account identifier can be mapped to, or otherwise associated with, additional identification data associated with the user and/or device(s) operated by the user.

Based at least in part on generating an account for the user, the account management module 808 can determine an association between the identifier and a profile corresponding to the service plan, as illustrated in block 1310.

Block 1312 illustrates storing an association between the profile and the identifier in a database. The account management module 808 can map, or otherwise associate, the identifier with the profile in the eID/profile database 816.

Block 1314 illustrates refraining from sending an offer for a service plan to the device. Based at least in part on determining that the device 200 is not associated with an eSIM, the account management module 808 can refrain from sending an offer for a service plan to the device 200.

Although the subject matter has been described in language specific to structural data items and/or methodological acts, it is to be understood that the subject matter defined in the appended claims is not necessarily limited to the specific data items or acts described. Rather, the specific data items and acts are disclosed as exemplary forms of implementing the claims.

What is claimed is:

1. A system comprising:
   an application associated with a device, the application including one or more first instructions that are executable to:
   present, via a user interface of the device, a graphical user interface (GUI);
   determine identification data, based at least in part on a received user input via the GUI, associated with at least one of the device or an account of a user operating the device, the identification data including at least an identification code particular to an embedded subscriber identity module (eSIM) associated with the device and one or more characteristics of a desired telecommunication service plan, wherein the one or more characteristics do not include an identification of the desired telecommunication service plan; and
   send the identification data to one or more first servers associated with a service provider, the service provider providing telecommunication services for the device; and
   the one or more first servers including:
   one or more first processors; and
   one or more second instructions executable by the one or more first processors to:
   receive, from the application, the identification data;
   identify, based at least in part on the one or more characteristics, a telecommunication service plan for the user;

send, based at least in part on identifying the telecommunication service plan, a message to the application including an offer having a recommendation to purchase the telecommunication service plan;

store a first association between an eSIM profile and the identification code in a first database;

receive, from the device, a request for the eSIM profile, the request including the identification code and wherein one or more second servers previously provisioned an address associated with the service provider to the application responsive to a query for available eSIM profiles;

access the first database to identify the first association between the eSIM profile and the identification code; and provision, to the device, the eSIM profile, wherein a local profile management module associated with the device associates the eSIM profile with the eSIM associated with the device.

2. The system as claim 1 recites, wherein the one or more second instructions are further executable by the one or more first processors to send an indication of the first association between the eSIM profile and the identification code to the one or more second servers.

3. The system as claim 2 recites, further comprising the one or more second servers including:
one or more second processors; and
one or more third instructions executable by the one or more second processors to:
receive the indication of the first association;
determine, based at least in part on the indication, the service provider that sent the indication; and
store a second association between the identification code and the service provider in a second database.

4. The system as claim 3 recites, wherein the one or more third instructions are further executable by the one or more second processors to:
receive, from the application, the query for available eSIM profiles;
access the second database to identify the second association between the identification code and the service provider; and
provision the address associated with the service provider to the device.

5. The system as claim 1 recites, wherein the identification data further includes an account identifier associated with the account of the user.

6. The system as claim 1 recites, wherein the one or more second instructions are further executable by the one or more first processors to:
determine the eSIM profile based at least in part on the telecommunication service plan identified for the user.

7. The system as claim 1 recites, wherein the one or more first instructions are further executable to, prior to the local profile management module associating the eSIM profile with the eSIM associated with the device:
access one or more restrictions associated with the eSIM; and
determine that installing the eSIM profile does not violate the one or more restrictions.

8. A computer-implemented method comprising:
presenting, via a user interface of a device operated by a user, a first graphical user interface (GUI);

receiving, via the first GUI, user input including a selection of one or more characteristics for a desired service plan, wherein the one or more characteristics do not include an identification of the desired service plan;

determining identification data, based at least in part on the user input, including at least an identifier particular to an embedded subscriber identity module (eSIM) associated with the device;

sending the identification data and the one or more characteristics to one or more first servers associated with a service provider;

receiving, from the one or more first servers, an offer for a service plan;

presenting, via the user interface of the device, a second GUI that enables the user to accept the offer for the service plan, the offer including a recommendation to purchase the service plan based at least in part on the one or more characteristics selected by the user;

sending, via an application executing on the device and in response to the application launching, a query to one or more second servers associated with a discovery service, the query including the identifier and inquiring whether the discovery service is aware of any profiles for the identifier;

receiving, from the one or more second servers and based at least in part on the discovery service including an association between the identifier and the service provider, access data including an address for communicating with the service provider;

sending, based at least in part on the address, a request for a profile that is available from the service provider, the request including the identifier;

receiving, from the one or more first servers, the profile; and associating the profile with the eSIM.

9. The computer-implemented method as claim 8 recites, further comprising:
sending an indication of an acceptance to the one or more first servers.

10. The computer-implemented method as claim 8 recites, further comprising, prior to associating the profile with the eSIM:
accessing one or more restrictions associated with the eSIM; and
determining that installing the profile does not violate the one or more restrictions.

11. The computer-implemented method as claim 8 recites, wherein associating the profile with the eSIM comprises storing the profile with the eSIM unless or until a new profile is received.

12. The computer-implemented method as claim 8 recites wherein the application enables the user to at least one of:
interact with the device to provide one or more inputs, the one or more inputs utilized to determine at least a portion of the identification data;
send the query to the one or more second servers; or
facilitate sending the request for the profile to the one or more first servers.

13. The system as claim 7 recites, wherein the one or more restrictions include at least one of an indication that an existing profile cannot be removed from the device or an indication that the existing profile cannot be deactivated on the device.

14. The system as claim 1 recites, further comprising prompting the user to input the identification data via the GUI and determining the identification data is based at least in part on receiving the user input.

15. A computing device including:
one or more processors;
a memory; and
one or more instructions stored in the memory and executable by the one or more processors to:
present, via a user interface of the computing device operated by a user, a first graphical user interface (GUI);
receive, via the first GUI, user input including a selection of one or more characteristics for a desired service plan, wherein the one or more characteristics do not include an identification of the desired service plan;
determine identification data, based at least in part on the user input, including at least an identifier particular to an embedded subscriber identity module (eSIM) associated with the computing device;
send the identification data and the one or more characteristics to one or more first servers associated with a service provider;
receive, from the one or more first servers, an offer for a service plan;
present, via the user interface of the computing device, a second GUI that enables the user to accept the offer for the service plan, the offer including a recommendation to purchase the service plan based at least in part on the one or more characteristics selected by the user;
send, via an application executing on the computing device and in response to the application launching, a query to one or more second servers associated with a discovery service, the query including the identifier and inquiring whether the discovery service is aware of any profiles for the identifier;
receive, from the one or more second servers and based at least in part on the discovery service including an association between the identifier and the service provider, access data including an address for communicating with the service provider;
send, based at least in part on the address, a request for a profile that is available from the service provider, the request including the identifier;
receive, from the one or more first servers, the profile; and
associate the profile with the eSIM.

16. The computing device as claim 15 recites, further comprising:
sending an indication of an acceptance to the one or more first servers.

17. The computing device as claim 15 recites, further comprising, prior to associating the profile with the eSIM:
accessing one or more restrictions associated with the eSIM; and
determining that installing the profile does not violate the one or more restrictions.

18. The computing device as claim 17 recites, wherein the one or more restrictions include at least one of an indication that an existing profile cannot be removed from the computing device or an indication that the existing profile cannot be deactivated on the computing device.

19. The computing device as claim 15 recites wherein the application enables the user to at least one of:
interact with the computing device to provide one or more inputs, the one or more inputs utilized to determine at least a portion of the identification data;
send the query to the one or more second servers; or
facilitate sending the request for the profile to the one or more first servers.

20. The computing device as claim 15 recites, wherein associating the profile with the eSIM comprises storing the profile with the eSIM unless or until a new profile is received.

\* \* \* \* \*